United States Patent [19]

Brown

[11] 3,914,744

[45] Oct. 21, 1975

[54] SHIFTING APPARATUS

[75] Inventor: James L. Brown, Chelmsford, Mass.

[73] Assignee: Honeywell Information Systems Inc., Waltham, Mass.

[22] Filed: Jan. 2, 1973

[21] Appl. No.: 320,011

[52] U.S. Cl. .............................................. 340/172.5

[51] Int. Cl.$^2$ ................... G11C 19/00; G11C 13/00

[58] Field of Search .................... 340/174 SR, 172.5

[56] References Cited

UNITED STATES PATENTS

| | | | |
|---|---|---|---|
| 3,274,556 | 9/1966 | Paul et al. | 340/172.5 |
| 3,311,896 | 3/1967 | Delmege et al. | 340/172.5 |
| 3,436,737 | 4/1969 | Iverson | 340/172.5 |
| 3,596,251 | 7/1971 | Buchan et al. | 340/172.5 |
| 3,610,903 | 10/1971 | Stokes | 235/154 |
| 3,611,309 | 10/1971 | Zingg | 340/172.5 |
| 3,618,033 | 11/1971 | Nordquist | 340/172.5 |
| 3,659,274 | 4/1972 | Kyser | 340/172.5 |
| 3,747,070 | 7/1973 | Huttenhoff | 340/172.5 |
| 3,790,960 | 2/1974 | Amdahl | 340/172.5 |

*Primary Examiner*—Harvey E. Springborn
*Assistant Examiner*—James D. Thomas
*Attorney, Agent, or Firm*—William F. White; Ronald T. Reiling

[57] ABSTRACT

A novel shifting apparatus is disclosed herein. The shifting apparatus is comprised of a control register, a shifting circuit and a storage register. The control register contains a binary shift command which governs the type of shift, the direction of the shift and the amount of shift. The shifting circuit is operative in response to the binary shift command from the control register to shift a block of data stored within the storage register. The shifting circuit comprises at least one substage which itself comprises a number of bit shift cells. Each bit shift cell implements a commanded bit positional shift. The type of shifting which is implemented within each bit shift cell is completely free flowing without any need of intermediate storage. The resulting overall free flow of bit shifts provides for an almost instantaneous return of a shifted block of data back to the storage register. The shifting circuit also contains special circuitry for handling a block of data differently depending on the type of shift which is being implemented.

16 Claims, 19 Drawing Figures

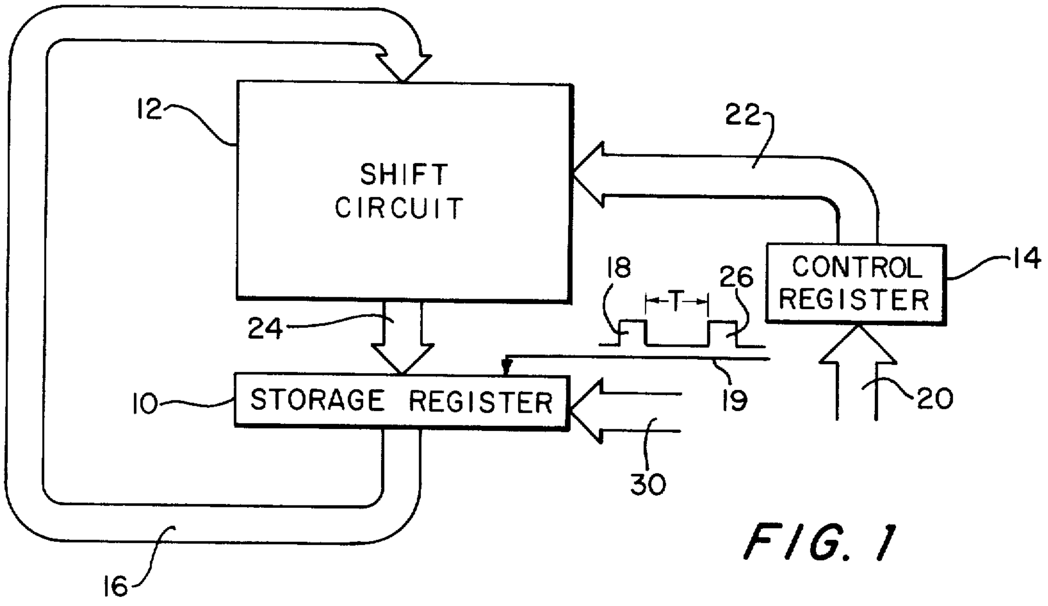

FIG. 1

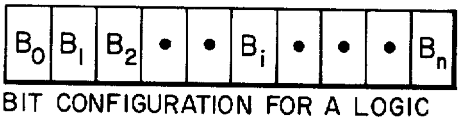

BIT CONFIGURATION FOR A LOGIC OPERATION

FIG. 2a

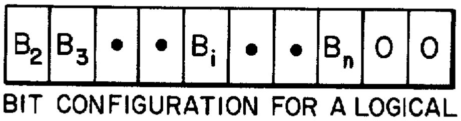

BIT CONFIGURATION FOR A LOGICAL SHIFT TO THE LEFT OF 2 BIT POSITIONS

FIG. 2b

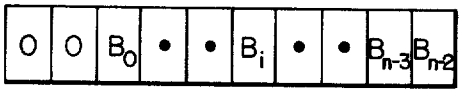

BIT CONFIGURATION FOR A LOGICAL SHIFT TO THE RIGHT OF 2 BIT POSITIONS

FIG. 2c

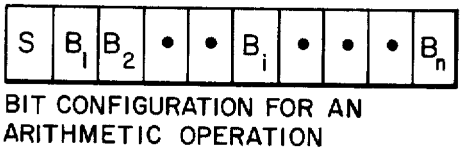

BIT CONFIGURATION FOR AN ARITHMETIC OPERATION

FIG. 2d

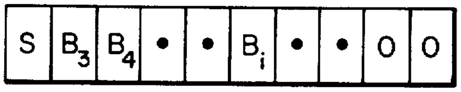

BIT CONFIGURATION FOR AN ARITHMETIC SHIFT TO THE LEFT OF 2 BIT POSITIONS

FIG. 2e

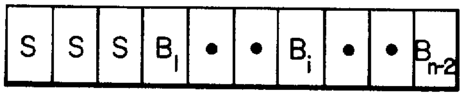

BIT CONFIGURATION FOR AN ARITHMETIC SHIFT TO THE RIGHT OF 2 BIT POSITIONS

FIG. 2f

| BINARY SHIFT COMMAND | | | GATING | | RESULTING BIT SHIFT | |
|---|---|---|---|---|---|---|
| L/R | $2^1$ | $2^0$ | DECODER OUTPUT | GATE | BIT POSITION OUT | SHIFT |
| 0 | 0 | 0 | 0 | 44 | 50 | RT. 0 |
| 0 | 0 | 1 | 1 | 46 | 49 | RT. 1 |
| 0 | 1 | 0 | 2 | 48 | 48 | RT. 2 |
| 0 | 1 | 1 | 3 | 50 | 47 | RT. 3 |
| 1 | 0 | 0 | 4 | 44 | 50 | LEFT 0 |
| 1 | 0 | 1 | 5 | 52 | 51 | LEFT 1 |
| 1 | 1 | 0 | 6 | 54 | 52 | LEFT 2 |
| 1 | 1 | 1 | 7 | 56 | 53 | LEFT 3 |

| BINARY SHIFT COMMAND | | | GATING | | RESULTING BIT SHIFT | |
|---|---|---|---|---|---|---|
| L/R | $2^3$ | $2^2$ | DECODER OUTPUT | GATE | BIT POSITION OUT | SHIFT |
| 0 | 0 | 0 | 0 | 60 | 50 | RT. 0 |
| 0 | 0 | 1 | 1 | 62 | 46 | RT. 4 |
| 0 | 1 | 0 | 2 | 64 | 42 | RT. 8 |
| 0 | 1 | 1 | 3 | 68 | 38 | RT. 12 |
| 1 | 0 | 0 | 4 | 60 | 50 | LEFT 0 |
| 1 | 0 | 1 | 5 | 70 | 54 | LEFT 4 |
| 1 | 1 | 0 | 6 | 72 | 58 | LEFT 8 |
| 1 | 1 | 1 | 7 | 74 | 62 | LEFT 12 |

BIT SHIFT CELL $Z_{50}$

| BINARY SHIFT COMMAND | | | GATING | | RESULTING BIT SHIFT | |
|---|---|---|---|---|---|---|
| L/R | $2^5$ | $2^4$ | DECODER OUTPUT | GATE | BIT POSITION OUT | SHIFT |
| 0 | 0 | 0 | 0 | 78 | 50 | RT. 0 |
| 0 | 0 | 1 | 1 | 80 | 34 | RT. 16 |
| 0 | 1 | 0 | 2 | 82 | 18 | RT. 32 |
| 0 | 1 | 1 | 3 | 84 | 2 | RT. 48 |
| 1 | 0 | 0 | 4 | 78 | 50 | LEFT 0 |
| 1 | 0 | 1 | 5 | 86 | ZERO FILL | NONE |
| 1 | 1 | 0 | 6 | 88 | ZERO FILL | NONE |
| 1 | 1 | 1 | 7 | 90 | ZERO FILL | NONE |

| BINARY SHIFT COMMAND | | | GATING | | RESULTING BIT SHIFT | |
|---|---|---|---|---|---|---|
| L/R | 2 | 2 | DECODER OUTPUT | GATE | BIT POSITION OUT | SHIFT |
| 0 | 0 | 0 | 0 | 102 | 0 | RT. 0 |
| 0 | 0 | 1 | 1 | 104 | ZERO FILL | NONE |
| 0 | 1 | 0 | 2 | 106 | ZERO FILL | NONE |
| 0 | 1 | 1 | 3 | 108 | ZERO FILL | NONE |
| 1 | 0 | 0 | 4 | 102 | 0 | LEFT 0 |
| 1 | 0 | 1 | 5 | 110 | 1 | LEFT 1 |
| 1 | 1 | 0 | 6 | 112 | 2 | LEFT 2 |
| 1 | 1 | 1 | 7 | 114 | 3 | LEFT 3 |

| BINARY SHIFT COMMAND | | | GATING | | RESULTING BIT SHIFT | |
|---|---|---|---|---|---|---|
| L/R | 2 | 2 | DECODER OUTPUT | GATE | BIT POSITION OUT | SHIFT |
| 0 | 0 | 0 | 0 | 122 | 1 | RT. 0 |
| 0 | 0 | 1 | 1 | 124 | 0 | RT. 1 |
| 0 | 1 | 0 | 2 | 126 | SPF | NONE |
| 0 | 1 | 1 | 3 | 128 | SPF | NONE |
| 1 | 0 | 0 | 4 | 122 | 1 | LEFT 0 |
| 1 | 0 | 1 | 5 | 130 | 2 | LEFT |
| 1 | 1 | 0 | 6 | 132 | 3 | LEFT |
| 1 | 1 | 1 | 7 | 134 | 4 | LEFT |

SHIFTING APPARATUS

BACKGROUND OF THE INVENTION

The subject invention relates to electronic data shifting apparatus. More particularly, it relates to a shifting apparatus commonly found within a central processor for implementing shifts during both arithmetic and logical operations.

Today's computers are required to execute arithmetic and logic operations at ever-increasing speeds. In order to implement most arithmetic and logic operations, it is often necessary to position the block of data which is to be thereafter operated on. Sometimes this requires a rather large positional movement of the block of data. Such a movement of the block of data significantly affects the overall time required to accomplish a particular arithmetic or logic operation.

There are a number of types of shifting apparatus which can be used to implement large shifts of data blocks. One type of shifting apparatus is the conventional shift register which incrementally shifts the stored data one or more fixed number of bit positions at a time. This type of shift apparatus usually requires storage of the data after each particular shift. In many instances, these conventional shift registers are tied into machine cycle time so as to require a cycle of machine time for each shift. This can require many cycles of machine time to implement a multi-bit positional shift. More recently, a type of shifting apparatus has been developed which accomplishes shifts of more than one bit position at a time. This latter type of shifting apparatus often consists of complicated interconnections between the various bit storage locations to provide for each and every possible shift contingency.

OBJECTS OF THE INVENTION

It is an object of this invention to provide a fast shifting circuit which minimizes the number of interconnections necessary to implement multiple bit positional shifting.

It is another object of this invention to eliminate any time-consuming storage of the data during the actual shift operation.

It is a still further object of this invention to provide a data shifting circuit which is capable of implementing a fast shift for either a logic or an arithmetic shift operation.

SUMMARY OF THE INVENTION

To achieve the above mentioned objects, the present invention provides a novel shifting apparatus which minimizes interconnections, eliminates any intermediate storage andd is capable of performing high speed arithmetic or logical shifts. The shifting apparatus comprises a control register, a shifting circuit and a storage register. The control register issues a binary shift command to the shifting circuit as to the type of shift, the direction of shift and the amount of shift. The shifting circuit immediately adopts the particular shift configuration dictated by the shift command and shifts an incoming block of data from the storage register. The block of data is returned to the storage register in its shifted state after a single pass through the shift circuit.

In a preferred embodiment, the shifting circuit comprises three separate shifting substages, each of which implements a particular portion of the binary shift command. Each substage includes 64 individual bit shift cells for implementing shifts of individual incoming bits. The bit shift cells are capable of selecting a particular bit from amoung a group of incoming bits. This selection is in accordance with the shift command for the particular substage.

BRIEF DESCRIPTION OF THE DRAWINGS

For a better understanding of the present invention, reference should be made to the accompanying drawings wherein:

FIG. 1 shows the basic components within the shifting apparatus, namely, the shift circuit, the control register, and the storage register;

FIGS. 2*a*, 2*b*, 2*c*, 2*d*, 2*e* and 2*f* show several possible storage configurations of the storage register of FIG. 1 which may occur during and following an implemented shift by the shift circuit of FIG. 1;

DESCRIPTION OF THE PREFERRED EMBODIMENT

Figure 3:
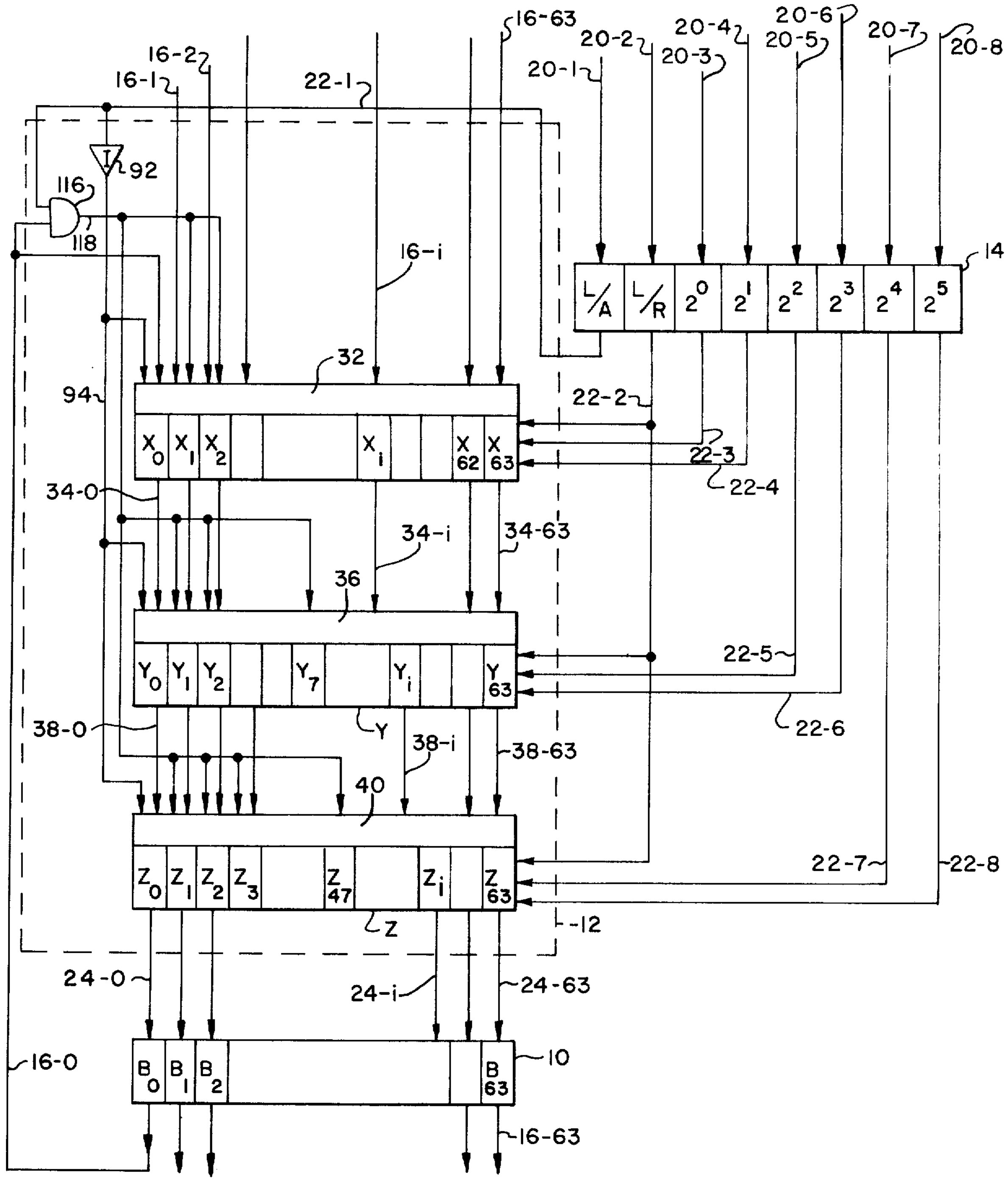
FIG. 3 shows the apparatus of FIG. 1 in more detail and in particular illustrates the three shifting substages of the shift circuit.

Referring now to FIG. 1 wherein the general components of the subject invention are seen to consist of a storage register 10, a shift circuit 12 and a control register 14. The operation of these general components is such that the storage register 10 outputs a stored block of data onto a line 16 in response to a shift pulse 18 over a line 19.

The control register 14 has either been previously loaded or is simultaneously loaded with a set of shift commands over a line 20. These shift commands are immediately transmitted to the shift circuit 12 over a line 22. The shift circuit 12 immediately adopts the configuration dictated by the shift commands.

The data block which is transmitted over the line 16 to the shift circuit 12 is shifted according to the shift configuration dictated by the shift commands appearing on the line 22. The shifted data block is outputed to the storage register 10 over a line 24. According to the operation of the invention the shifted block of data which is outputed on the line 24 is loaded into the storage register 10 by a load pulse 26 occurring at a time T following the shift pulse 18. It is to be understood that the time T between the shift pulse 18 and the load pulse 26 is primarily limited by the time it takes to establish a particular configuration for the shift circuit 12. This latter time interval is substantially less than a normal machine cycle of time for a modern day central processor.

Turning now to FIGS. 2*a* through 2*c*, the storage register 10 is shown in various possible storage configurations which may occur during various logical shift operations. Beginning with FIG. 2*a*, a block of data identifiable as bits $B_0$ through $B_n$ is stored in the "$n+1$" bit storage locations of the storage register 10. This represents a full complement of data bits including a bit $B_0$ in the left most bit storage location. It is to be understood that each bit storage location within the storage register 10 defines a particular bit position for the bit stored therein. It is the function of the shifting apparatus of FIG. 1 to shift the stored block of data of FIG. 2*a* any number of bit positions from zero to *n* bit positions. FIGS. 2*b* and 2*c* show the results of logically shifting the block of data of FIG. 2*a* two bit positions to the left and two bit positions to the right. It is to be noted in FIG. 2*b* that the bit $B_0$ and $B_1$ are dropped off at the left while the two right most bit storage locations are filled with zeroes. It is to be furthermore noted that the logical shift of FIG. 2*c* causes the two right most bits, $B_n$ and $B_{n-1}$ to be dropped off at the right while the two left most bit storage locations are filled with zeroes.

Turning now to FIG. 2*d*, the storage register 10 is shown loaded with a full complement of data bits constituting a data block as it would initially appear prior to an arithmetic shift operation. The block of data consists of bits $B_1$ through $B_n$ with a sign bit S present in the zero-eth storage location. It will be appreciated that the storage register 10 must preserve the sign bit S during any arithmetic shifting operation. This is shown for example in FIG. 2*e* for an arithmetic shift to the left of two bit positions. As can be seen, the bits $B_1$ and $B_2$ drop off while the sign bit S is preserved. It is also to be seen that the two right most bit storage locations are zero filled. FIG. 2*f* illustrates an arithmetic shift to the right of two bit positions. As can be seen, bit $B_n$ and $B_{n-1}$ drop off and the bit storage locations 1 and 2 are filled with the sign bits S.

Turning now to FIG. 3, wherein a detailed illustration of the structure of FIG. 1 is shown. The control register 14 is seen to comprise an eight bit register which receives an eight bit binary shift command over bit lines 20-1 through 20-8. The first bit in the binary shift command is the L/A bit. The L/A bit signifies whether the particular shift is to be either a logical shift (L/A=1) or an arithmetical shift (L/A=0). The next seven bits of the binary shift command define the direction and amplitude of the particular shift. The first of these bits is an L/R bit. The L/R bit defines the direction of shift by being a logical one for a shift to the left and a logical zero for a shift to the right. The remaining six bits of the binary shift command define the amplitude of shift in binary as is shown.

The eight bit binary shift command which is stored in the control register 14 is inputed to the shift circuit 12 via the lines 22-1 through 22-8. The amplitude shift commands which are present on the lines 22-3 through 22-8, are grouped into pairs of two and inputed to a respective shifting substage X, Y or Z within the shift circuit 12. The X-substage receives the amplitude shift commands of $2^0$ and $2^1$ over the lines 22-3 and 22-4, the Y-substage receives the amplitude shift commands of $2^2$ and $2^3$ over the lines 22-5 and 22-6 and the Z-substage receives the amplitude shift commands of $2^4$ and $2^5$ over the lines 22-7 and 22-8. Each substage operates to implement the particular range of shifts defined by its particular pair of amplitude shift commands. The X-substage performs shifts of 0 to 3 bit positions, the Y-substage performs shifts of 0, 4, 8 and 12 bit positions and the Z-substage performs shifts of 0, 16, 32, and 48 bit positions. It is to be appreciated that the shifts of each substage are additive and that the combined additive shifts from each substage gives a shift capability of 0 to 63 bit positions for the shift circuit 12.

The capability of bidirectional shifting is also present in each substage in the form of the L/R shift command which is inputed to each of the substages over the line 22-2. Each substage is capable of performing shifts to the right (L/R=1) or to the left (L/R=0).

Turning now to the manner in which the data is inputed and processed through the shift circuit 12, it is first of all seen that the data block denoted as bits $B_0$ through $B_n$ within the storage register 10 is made available to the X-substage via a set of lines denoted as 16-0 through 16-63. According to the invention, these lines are sub-grouped in an area 32 within the X-substage in a manner which is not shown in FIG. 3. For the present it is merely to be understood that each of the sub-groupings of lines is inputed to a respective bit shift cell $X_i$. Each bit shift cell $X_i$ selects one of its sub-grouped lines and outputs the bit contents of the selected line onto its output line 34-*i*. The bit which is selected for output from each bit shift cell $Xi$ is dictated by the binary shift commands inputed to the X-substage over the lines 22-2, 22-3 and 22-4. The particular manner in which a bit shift cell operates will be explained hereinafter.

The Y and Z-substages are seen to function in a manner similar to the X-substage. The output lines 34-0 through 34-63 of the X-substage are sub-grouped within an area 36 of the Y-substage and thereafter inputed to a set of bit shift cells $Y_0$ through $Y_{63}$. Each bit shift cell $Y_i$ outputs a selected bit onto a respective output line 38-0 through 38-63. The output lines 38-0 through 38-63 are in turn sub-grouped within an area 40 of the Z-substage and thereafter inputed to a set of bit shift cells $Z_0$ through $Z_{63}$. Each bit shift cell $Z_i$ outputs a selected bit onto a respective output line 24-0 through 24-63. The output lines 24-0 through 24-63 apply the resultingly shifted block of data $B_0$ to $B_n$ to the storage register 10. As has been previously explained, the shifted block of data will be loaded into the storage register 10 upon the occurrence of the load pulse 26 as denoted in FIG. 1. The shift will be evidenced by the new storage locations which the bits $B_0$ through $B_n$ occupy within the storage register 10 as has been previously discussed in FIGS. 2*a* through 2*f*.

Figure 4:
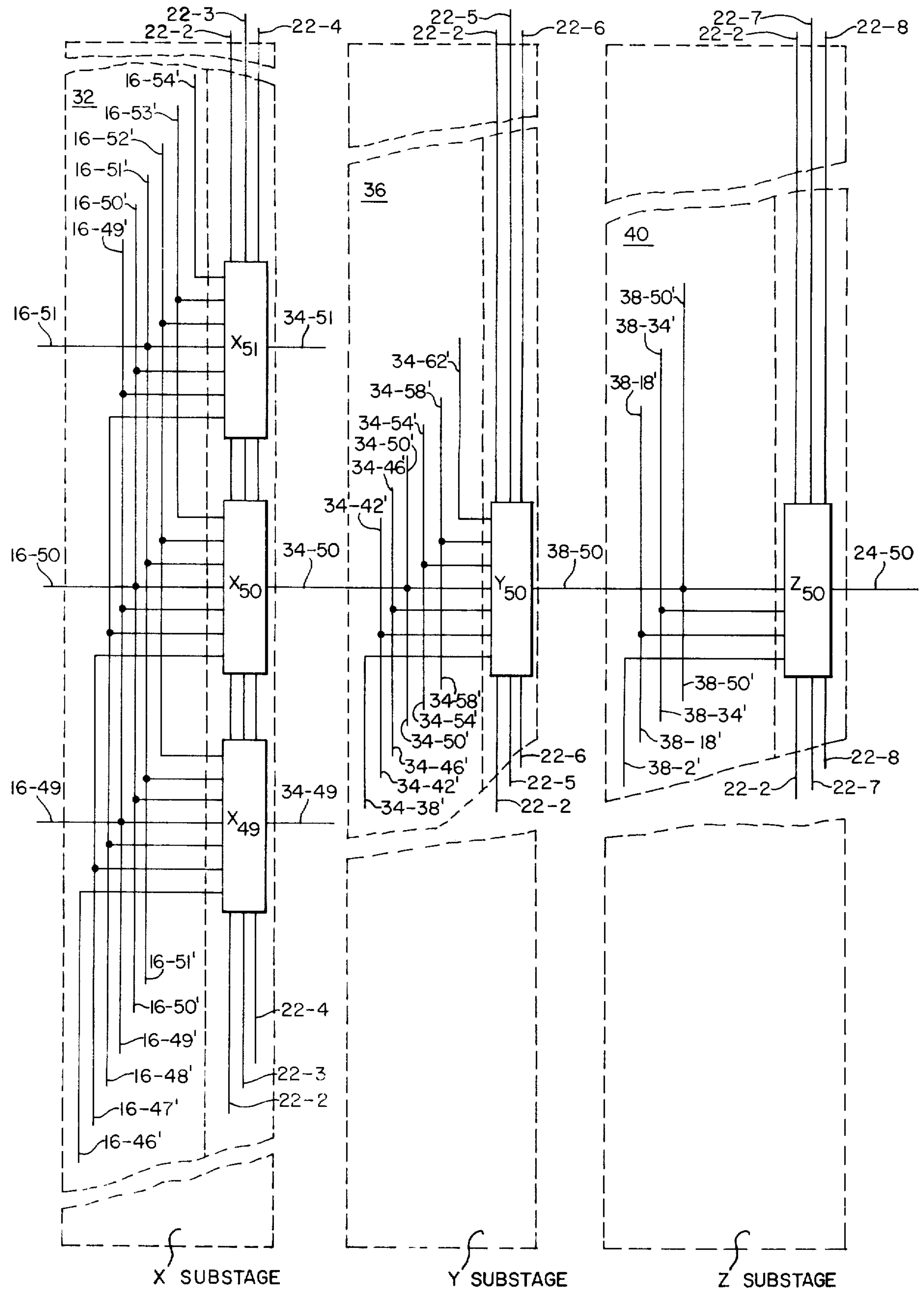
FIG. 4 shows the various interconnections between a set of exemplary bit position shift cells within the three shifting substages of FIG. 3.

Turning now to FIG. 4 wherein portions of the X, Y, and Z-substages are shown in detail. The various lines into and out of each respective substage portion are labeled in the same manner as they appear in FIG. 3. Beginning with the portion of the X-substage shown in FIG. 4, it is seen that the bit shift cells $X_{49}$ through $X_{51}$ each receive a sub-grouping of seven lines from the area 32. Each sub-grouping of seven lines is seen to contain an incoming line which carries the bit occupying the same bit position as that of the particular bit shift cell. In this regard it is seen that the lines 16-49 through 16-51 are directly inputed to their respective bit shift cells $X_{49}$ through $X_{51}$. The lines 16-49 through 16-51 are also respectively connected to a set of lines 16-49' through 16-51' within the area 32. Similarly, the lines 16-46' through 16-48' connect (in a manner not shown) to the lines 16-46 through 16-48 which bring the bits occupying the 46th through the 48th bit positions into the X-substage. The lines 16-52' through 16-54' are also connected (in a manner not shown) to the lines 16-52 through 16-54 which bring the bits occupying the 52nd through 54th bit positions into the X-substage. Each of the lines 16-46' through 16-54' transmit its bit to the various input sides of the bit shift cells $X_{49}$ through $X_{51}$ as is shown. Taking for example the bit shift cell $X_{50}$ it is seen that the lines 16-50, 16-51' through 16-54' and 16-47' through 16-49' transmit bits to the input side of the bit shift cell $X_{50}$. It is to be appreciated that the bit shift cell $X_{50}$ selectively outputs one of the transmitted bits appearing at its input side onto the line 34-50 in a manner which will be explained in detail hereinafter. The particular bit which is selectively outputed onto the line 34-50 is determined by the binary shift command present on the lines 22-2 through 22-4. The binary shift command present on the lines 22-2 through 22-4 will dictate the selection of a bit which is 0, 1, 2 or 3 bit positions to either side of the particular bit shift cell within the X-substage. The sub-grouping of the seven lines 16-47' through 16-49', 16-50, and 16-51' through 16-54' provides the necessary incoming bit positions to the bit shift cell $X_{50}$ for selecting bits which are 0, 1, 2, or 3 bit positions to either side of bit position 50. The bit shift cells $X_{49}$ and $X_{51}$ as well as the remaining X bit shift cells operate in a similar manner as that described for the bit shift cell $X_{50}$.

Turning now to the bit shift cell $Y_{50}$ within the Y-substage, it is seen that this bit shift cell is connected to a sub-grouping of seven lines within the area 36 of the Y-substage. This particular sub-grouping of lines comprises lines 34-38' through 34-46', 34-50, and 34-54' through 34-62'. These lines transmit the bits occupying bit positions of 4, 8 and 12 bit positions to either side of the bit shift cell $Y_{50}$. The bit shift cell $Y_{50}$ operates in response to the binary shift command over the lines 22-2, 22-5 and 22-6 to select one of the incoming bits from the respective sub-grouping of seven lines. The particularly selected bit is outputed on the line 38-50. It is to be appreciated that the other 63 bit shift cells within the Y-substage are also connected to their respective sub-groupings of seven lines within the area 36. These bit shift cells are also operative to implement shifts of 4, 8 and 12 bit positions in response to the binary shift command present on the lines 22-2, 22-5 and 22-6.

The bit shift cell $Z_{50}$ is seen to be connected to a sub-grouping of lines within the area 40 of the Z-substage. This particular sub-grouping of lines is seen to comprise only the four lines 38-2', 38-18', 38-34' and 38-50. There are no incoming lines from higher ordered bit positions due to the fact that the lowest magnitude of shift within the Z-substage is that of 16 bit positions which would require bringing in a bit occupying the 66th bit position. Such a bit position does not physically exist in the preferred embodiment being illustrated. Hence any shift from a fictitious bit position is merely not allowed by virtue of not providing a line into the particular bit shift cell. It should nonetheless be understood that the bit shift cell $Z_{50}$ is capable of implementing any binary shift command appearing on the lines 22-2, 22-7 and 22-8 which does not amount to a shift from a fictitious bit position. In this regard, the bit shift cell $Z_{50}$ is seen to be capable of implementing a shift of a bit appearing on any of the lines 38-2', 38-18', 38-34' and 38-50. It should be furthermore understood that the remaining bit shift cells within the Z-substage (as well as many of the bit shift cells within the X and Y-substages) are connected to sub-groupings which only allow for shifts from physically existing bit positions and do not contain line connections from fictitious bit positions.

Up until now, the bit shift cells have been referred to as elements which are capable of shifting any of the bits appearing on their sub-groupings of lines. The particular structure of a bit shift cell and the manner in which it operates will now be discussed for several of the bit shift cells. In particular the bit shift cells $X_{50}$, $Y_{50}$ and $Z_{50}$ will be discussed first.

Figures 5A, 5B:
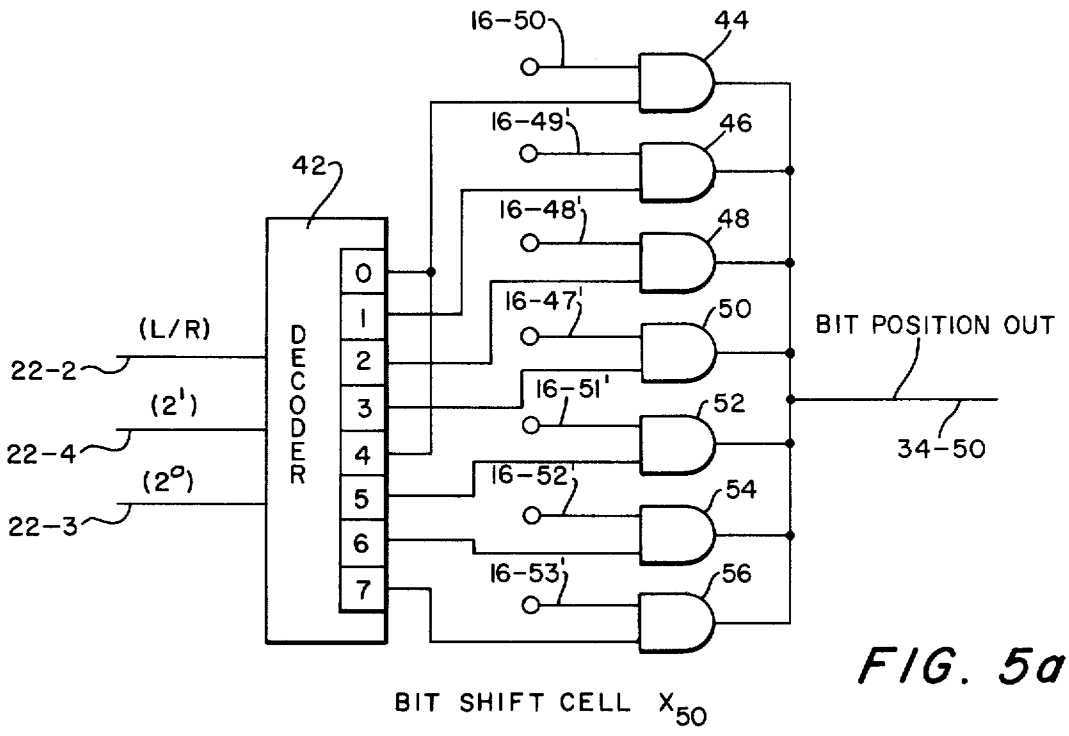
FIGS. 5*a* and 5*b* show the bit position shift cell $X_{50}$ of FIG. 4 in detail.

The detailed structure of the bit shift cell $X_{50}$ is shown in FIG. 5*a*. The bit shift cell $X_{50}$ is seen to first consist of a decoder 42 which receives the binary shift command over the lines 22-2 through 22-4. The decoder 42 outputs a logical high signal on a single output line which corresponds to the binary count present on the lines 22-2 through 22-4. The decoder output corresponding to each binary shift command is tabulated in the first four columns of FIG. 5*b*. The decorder outputs are inputed to a set of AND gates 44 through 56 as shown in FIG. 5*a*. The AND gates are tabulated in the fifth column of FIG. 5*b*. Associated with each AND gate is a given bit positional input. It will be remembered that the bit shift cell $X_{50}$ receives a sub-grouping of seven bit positional inputs. These bit positional inputs are shown as inputs to the AND gates 44 through 56 and are labelled in the same manner as they appeared in FIG. 4. The outputs of the AND gates 44 through 56 are seen to be connected to the line 34-50. The particular bit position outputed on the line 34-50 is dependent on which of the AND gates 44 through 56 has been enabled by the output of the decoder 42. The output of the decoder 42 is a function of the binary shift command occurring on the lines 22-2 through 22-4. Taking for example the binary shift command wherein all of the lines 22-2 through 22-4 are logically low. This corresponds to a binary shift command of 000 as shown on row 1 of FIG. 5*b*. The decoder output of 0 is logically high which enables gate 44. The resulting bit which will be outputed onto the line 34-50 is the bit present on the line 16-50 which has been inputed to the gate 44. It will be remembered that the bit position represented by the line 16-50 corresponds to the 50th bit position within the storage register 10. The bit position which is thus indicated as being outputed on the line 34-50 is that of bit position 50 which appears in the sixth column of FIG. 5*b*. This corresponds to a shift to the right of zero as indicated in column 7. The shift is designated as a shift to the right due to the L/R bit being zero. It is to be noted that a shift to the left of zero bit positions is dictated by a binary shift command of 100 which is shown in the fifth row of FIG. 5*b*. The gate 44 is again enabled due to the decoder output corresponding to a decoded shift command of 4 being inputed to the gate 44. The gates 46 through 56 are seen to be similarly enabled according to their respective binary shift commands as is tabulated in FIG. 5*b*. The shift resulting from the enablement of each respective AND gate is also tabulated in Columns 6 and 7 of FIG. 5*b*. It is thus seen that the bit shift cell $X_{50}$ is capable of implementing a shift of anywhere from zero to three bit positions to either the right or left of the 50th bit position.

Figures 6A, 6B:
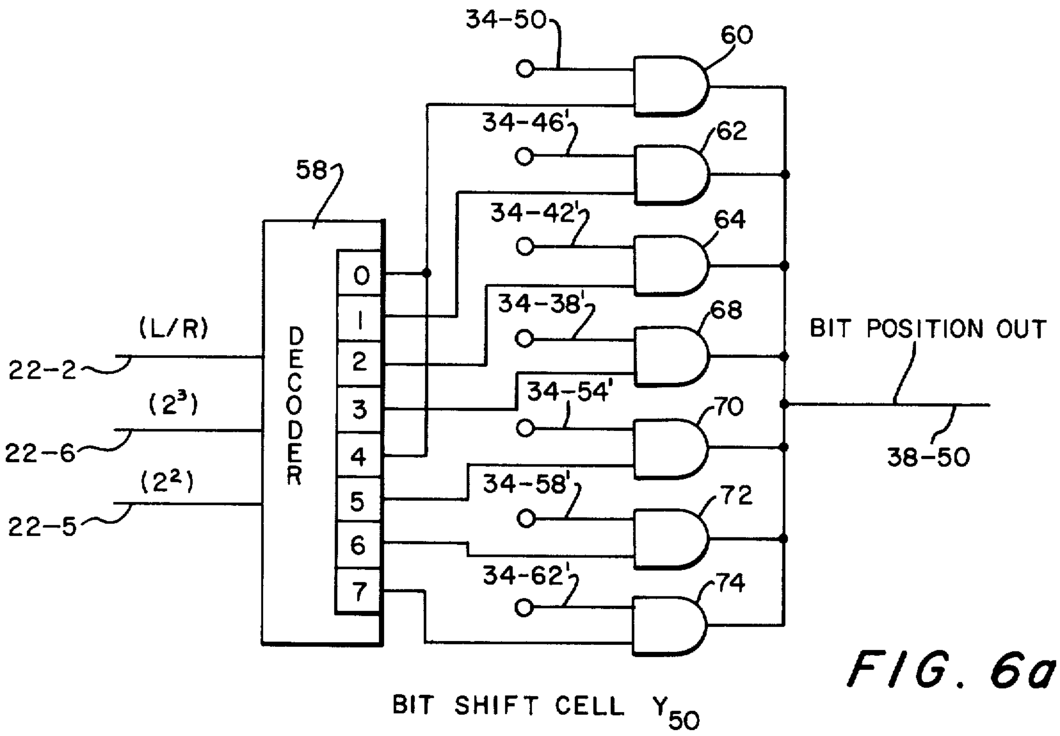
FIGS. 6*a* and 6*b* show the bit position shift cell $Y_{50}$ of FIG. 4 in detail.

Turning now to FIGS. 6*a* and 6*b* wherein the bit shift cell $Y_{50}$ is illustrated in detail. The bit shift cell $Y_{50}$ is similar to the bit shift cell $Z_{50}$ in that it comprises a decoder 58 which generates a decoded output of the binary shift command present on the lines 22-2, 22-5, and 22-6 as shown and tabulated in the first 4 columns of FIG. 6*b*. A set of gates 60 through 74 are enabled according to the decoded output from the decoder 58 in the same manner as has been previously described with respect to the bit shift cell $X_{50}$. The particular bit positions which are capable of being outputed on the line 38-50 correspond to the bit positions inputed to the respective AND gates 60 through 74. As has been previously explained with respect to FIG. 4, the bit shift cell $Y_{50}$ receives a sub-grouping of bit positions which are 4, 8 and 12 bit positions to the right and left of the bit positon 50 occupied by the bit shift cell $Y_{50}$. The various binary shift commands are tabulated in FIG. 6b. It is to be noted that the shift amplitudes capable of being commanded over the lines 22-6 and 22-7 correspond to the powers of $2^2$ and $2^3$.

Figures 7A, 7B:
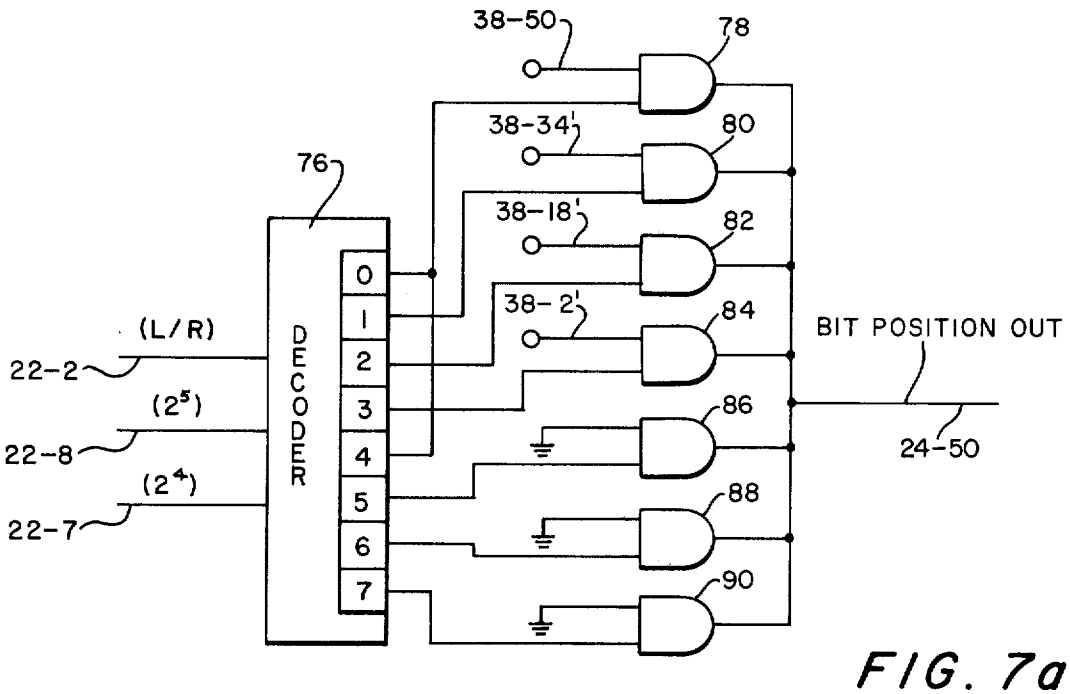
FIGS. 7*a* and 7*b* show the bit position shift cell $Z_{50}$ of FIG. 4 in detail.

FIGS. 7*a* and 7*b* illustrate the bit shift cell $Z_{50}$ in detail. The bit shift cell $Z_{50}$ is seen to comprise a decoder 76 which decodes a binary shift command present on the lines 22-2, 22-7 and 22-8 and outputs a decoded output corresponding to the various binary shift commands as is tabulated in the first four columns of FIG. 7*b*. The various decoded outputs from the decoder 76 enables one of the AND gates 78 through 90 to output a bit occupying a given bit position. The possible bit positions which can be outputed from the bit shift cell $Z_{50}$ are seen to consist of the second, 18th, 34th and 50th bit positions. (See column 6, FIG. 7*b*). These particular bit positions correspond to bit shifts to the left of 0, 16, 32, and 48 as is tabulated in column 7 of FIG. 7*b*. It is to be noted that the bit shift cell $Z_{50}$ does not output any bit positions corresponding to a shift from higher ordered bit positions. As has been previously explaind, the sub-grouping for the bit shift cell $Z_{50}$ does not include any bit positional inputs from fictitious bit positions. The inputs to gates 86 through 90 are rather grounded so as to provide logical zero outputs onto the line 24-50 in the event that any of the gates are so enabled. The possible binary shift commands which could cause gates 86 through 90 to become enabled are tabulated in the sixth through eighth rows of FIG. 7*b*. It is seen that these binary shift commands all result in a zero fill in column 6 of FIG. 7*b*.

It is to be noted that a zero fill will occur in at least some of the right most bit positions when there is a shifting to the left. This is shown, for example, in the logical and arithmetic shifts to the left of FIGS. 2*b* and 2*e*. The zero fills of FIGS. 2*b* and 2*e* are in the last two bit positions. It is to be noted that the bit shift cells $X_{63}$ and $X_{62}$ cause these particular zero fills. This is because the X-substage is the only active substage for the two bit positional shift. It is to be appreciated that various other bit shift cells in the X, Y and Z-substages may be required to implement possible zero fills for larger commanded shifts to the left. This is accomplished within the various bit shift cells in the same manner as has been previously explained with respect to the bit shift cell $Z_{50}$, namely, the gates which would receive bit positional inputs from fictitious bit positions are grounded.

It is to be noted that the logic shift of FIG. 2*b* differs from the arithmetic shift of FIG. 2*e* in the treatment of the zero-eth bit position. The arithmetic shift of FIG. 2*e* is seen to retain the signed bit S in the zero-eth bit position whereas the logic shift of FIG. 2*b* is filled with a zero. The signed bit S is retained in order that the shifted data block can remain "signed" for subsequent arithmetic operations.

It is furthermore to be noted in FIG. 2*f*, that the signed bit S fills the vacated bit positions when an arithmetic shift to the right occurs. The arithmetic shift to the right of two bit positions in FIG. 2*f* is to be contrasted with a similar logical shift to the right shown in FIG. 2*c*. In the latter, the vacated bit storage locations are filled with zeroes.

The illustrated differences between arithmetic shifts and logical shifts are implemented by the L/A signal which enters the shift circuit 12 over the line 22-1 as shown in FIG. 3. It will be remembered that the L/A bit is binary zero for a logic shift and binary one for an arithmetic shift. The L/A signal is seen to be first inputed to an inverter 92 within the shift circuit 12. The inverted output $\overline{L/A}$ is inputed to the bit shift cells $X_0$, $Y_0$ and $Z_0$ via a line 94. Each of these bit shift cells contain special circuitry which responds to the $\overline{L/A}$ signal so as to preserve the signed bit S in the zero-eth bit storage location during an arithmetic shift.

Figures 8A, 8B:
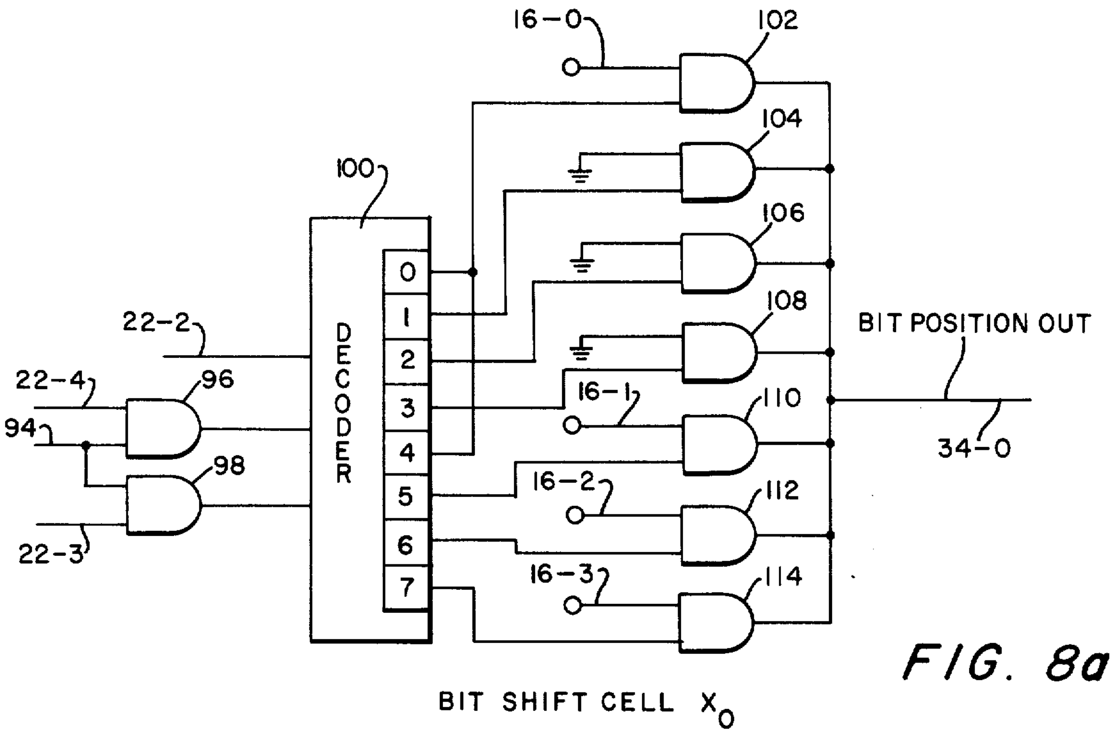
FIGS. 8*a* and 8*b* show the bit position shift cell $X_0$ in detail.

The special circuitry is shown by way of example in FIG. 8*a* for the bit shift cell $X_0$. The special circuitry is seen to consist of a pair of AND gates 96 and 98 which receive the $\overline{L/A}$ signal on the line 94. These AND gates also receive the amplitude shift commands over the lines 22-3 and 22-4. The $\overline{L/A}$ signal effectively disables the AND gates 96 and 98 for an arithmetic operation ($\overline{L/A}$ equals zero). The decoder 100 for the bit shift cell $X_0$ experiences a logically low signal (binary zero) from the lines 22-3 and 22-4 which causes the decoder output to enable only the AND gate 102. The resulting bit position which is outputed is the zero bit position. It is thus to be appreciated that the $\overline{L/A}$ bit is operative to disable any shifting within the bit shift cell $X_0$ and that it furthermore guarantees that the bit present on the line 16-0 will be the only one selected for output by the bit shift cell. It is to be furthermore understood that the $Y_0$ and $Z_0$ bit shift cells contain the same special circuitry as has been previously shown for the bit shift cell $X_0$. The latter bit shift cells $Y_0$ and $Z_0$ provide the same throughput of the incoming bit occupying the 0 bit position for an arithmetic shift operation.

The bit shift cell $X_0$ is seen to operate normally for a logical shift. A set of AND gates 104 through 114 are operative to output a given bit position associated with a given decoder output as is tabulated in FIG. 8*b*. The AND gates 104 through 108 are grounded so as to provide a zero fill for commanded shifts to the right which would result in shifts from fictitious bit positions. It is to be appreciated that the $Y_0$ and $Z_0$ bit shift cells contain similar gating that is similarly disabled so as to provide zero fill for shifts from fictitious bit positions. The bit shift cells $X_0$, $Y_0$and $Z_0$ are thus seen to both provide a throughput of the signed bit for an arithmetic operation and a zero fill for shifts from fictitious bit positions during a logical operation.

Turning now to the second major difference between an arithmetic shift to the right and a logical shift to the right, namely, the sign fill of the vacated bit positions for an arithmetic shift (FIG. 2*f*) versus the zero fill of the same vacated bit positions for a logical shift (FIG. 2*c*). This difference is implemented according to the invention by applying a sign producing function SPF to the appropriate gates within those bit shift cells which might be called upon to either zero fill (FIG. 2*c*) or sign fill (FIG. 2*f*). The sign producing function SPF produces the signed bit S for an arithmetic shift and produces a binary zero for a logical shift.

Referring to FIG. 3, the sign producing function SPF is generated by ANDing at an AND gate 116 the L/A bit present on the line 22-1 with the bit contents of the zeroeth bit storage location present on the line 16-0. It will be remembered that the bit contents of the zeroeth bit storage location of the storage register 10 is the signed bit S for an arithmetic operation (see FIG. 2*d*). The SPF output from the AND gate 116 will hence be equal to the signed bit S when L/A = 1 and equal to zero when L/A = 0. The sign producing function SPF is inputed to the bit shift cells $X_1$ and $X_2$, $Y_1$ through $Y_7$ and $Z_1$ through $Z_{47}$ via a line 118. Each of these bit shift cells contains at least one bit positional input which will require the SPF signal.

Figures 9A, 9B:
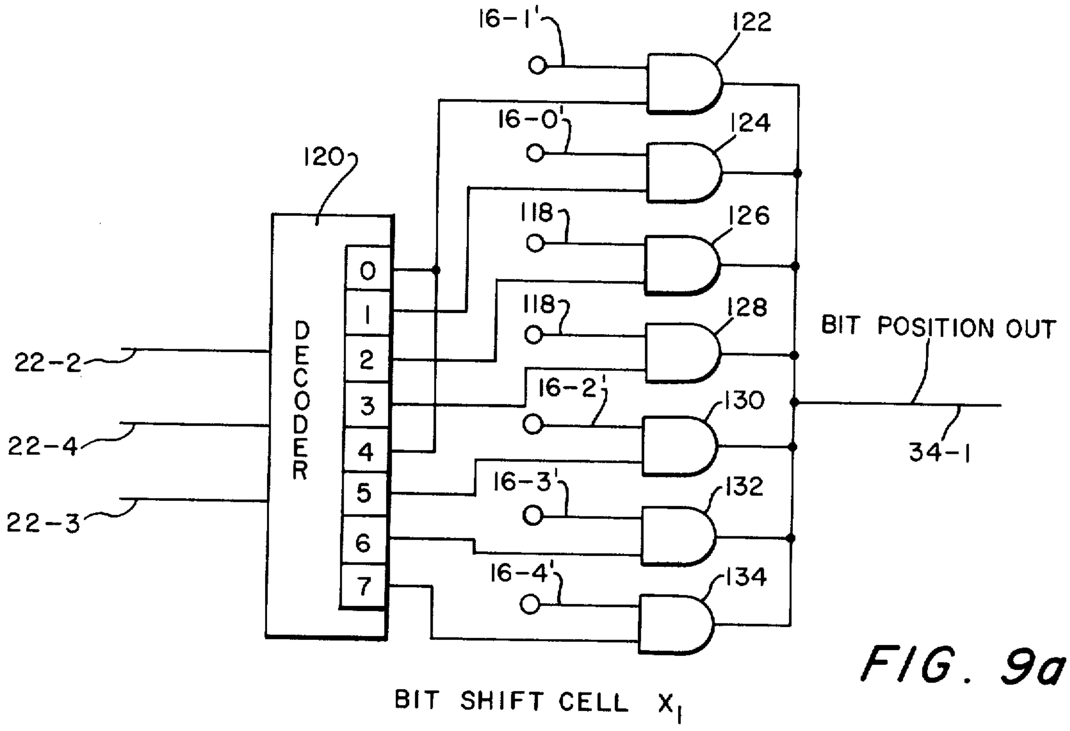
FIGS. 9*a* and 9*b* show the bit shift cell $X_1$ in detail.

The bit shift cell $X_1$ in FIG. 9*a* is typical of a bit shift cell receiving the SPF signal. The bit shift cell $X_1$ comprises a decoder 120 which selectively enables a set of AND gates 122 through 134 in response to the particular binary shift command present on the lines 22-2 through 22-4. This selective enablement of the AND gates is tabulated in the first five columns of FIG. 9*b*. Each selective enablement of an AND gate is operative to output onto the line 34-1 its particular bit positional input. In this regard, it is seen from columns 5 and 6 of FIG. 9*b* that the AND gates 126 and 128 output the SPF signal. This is of course due to the line 118 input to these gates. It is to be noted that the line 118 connections are only made to those gates which would otherwise theoretically receive incoming bits from fictitious bit positions.

It is also to be noted that the AND gate 124 receives an incoming bit from the zeroeth bit position. This bit will necessarily be the sign bit S when the storage register 10 has been loaded for an arithmetic shift operation. It is therefore to be appreciated that a sign fill will occur for a shift to the right of one bit position even though the SPF signal is not specifically inputed to the gate 124.

OPERATION OF THE INVENTION

Having disclosed a preferred embodiment of the invention, an example will now be given of the operation of the entire shifting apparatus. Taking as an example an arithmetic shift to the left of 63 bit positions of a data block consisting of 64 bits in the storage register 10. The control register 14 of FIG. 3 will be filled with ones. The L/A bit will be inverted through the inverter 92 and will cause the bit shift cells $X_0$, $Y_0$ and $Z_0$ to throughput the incoming bit from the line 16-0 and to eventually output it on the line 24-0. Next, the L/R bit being equal to one will dictate that the shifts within the X, Y and Z-substages are to be the left. The X-substage will receive an amplitude shift command of three bit positions over the lines 22-3 and 22-4. The bit shift cells $X_{63}$, $X_{62}$ and $X_{61}$ will effectuate a zero fill in their respective bit positions and the resultingly shifted data block will be outputed on the lines 34-0 through 34-60. Next, the Y-substage will shift the incoming data block an additional 12 bit positions to the left in response to the amplitude shift command present on the lines 22-5 and 22-6. This will result in a zero fill by the bit shift cells $Y_{52}$ through $Y_{63}$ which in conjunction with the zero fill already accomplished by the X-substage will result in a zero fill of the bit positions 49 through 63 out of the Y-substage. The shifted block of data will therefore be outputed to the Z-substage over the lines 38-0 through 38-48. The block of data will be shifted an additional 48 bit positions to the left within the Z-substage due to the amplitude shift command present on the lines 22-7 and 22-8. This will result in the remaining portion of the data block, namely, the bits occupying bit positions 1 through 48 being shifted off the left hand side of the positional data field originally defined by the storage register 10. It is to be noted that the signed bit occupying the zeroeth bit position will be retained since the L/A bit indicated an arithmetic shift. The data block which will be returned to the storage register 10 over the lines 24-0 through 24-63 will thus comprise a field of zeroes with the exception of signed bit occupying bit position 0.

It is to be appreciated that a complete sign fill will occur in the event that the binary shift command inputed into the control register 14 calls for an arithmetic shift to the right of 63 bit positions. It is to be furthermore appreciated that a logic shift to the right or left of 63 bit positions will result in a complete field of zeroes except for either bit position 63 (for a maximum logic shift to the right) or bit position 0 (for a maximum logic shift to the left). Finally a binary shift command of all zeroes in the control register 14 will dictate that the shift circuit 12 return all bits to their same respective bit positions which they previously occupied within the storage register 10.

From the foregoing, it is to be understood that the shift circuit 12 is operative to implement a multi-bit positional shift of a block of data consisting of up to 64 bits. The multi-bit shift can be in either of two directions and can be either an arithmetic shift or a logical shift. The multi-bit positional shift can be as large as 63 bit positions in either direction. All of this is to be accomplished within a time span T (see FIG. 1) which is limited only by the response time of the bit shift cells of the invention. This time is significantly less than a normal machine cycle of time for a central processor. It is thus to be appreciated that the shifting apparatus of the disclosed invention is capable of implementing any commanded shift of a block of data within one cycle of machine time so as to have the shifted block of data in position within the storage register 10 for the next operation during the next cycle of machine time.

It is furthermore to be understood that while the disclosed shift apparatus implements logic and arithmetic shifts, it is nonetheless possible to construct a shift apparatus which implements recirculating shifts according to the teachings of the invention. Such an apparatus would recirculate the bits into the particular substage instead of dropping them off to either the left or right side of the particular substage.

What is claimed is:

1. Shifting apparatus for bidirectionally shifting a block of data one or more bit positions at a time in response to a shift command, said shifting apparatus comprising:

register means for storing a block of data, said register means comprising a plurality of *n* bit storage locations with each bit storage location defining a particular bit position relative to the other bit storage locations;

a plurality of *n* lines each of which is connected to one of said *n* bit storage locations so as to be capable of transmitting the bit contents of the particular storage location; and shifting means, connected to said *n* lines so as to receive the incoming block of data, for bidirectionally shifting the block of data one or more bit positions at a time, said shifting means comprising:

a plurality of substages each consisting of only *n* bit shift cells with *n* substage output lines, said plurality of *n* substage output lines being either connected to the following substage or to the *n* bit storage location of said register means, each bit shift cell occupying a specific position and comprising:

a respective subgrouping of input lines, said respective subgrouping input lines being a subgroup of said plurality of *n* lines, wherein the respective subgrouping of input lines comprises:

a first input line being operative to input a bit occupying the bit position corresponding to the bit position of the particular bit shift cell, and a plurality of input lines adjacent to said first input line, each of said plurality of adjacent input lines being operative to input a bit occupying a different bit position from the bit position occupied by the particular bit shift cell, wherein each of said bit shift cells comprises:

first gating means for gating any bit present on said first input line to the output of said bit shift cell a plurality of second gating means for gating respective bits present on the plurality of input lines adjacent to said first input line to the output of said bit shift cell, and means for selectively activating only one of said gating means in response to the shift command for the particular substage.

2. The shifting apparatus of claim 1 wherein said means for selectively activating one of said gating means comprises:

means for decoding the shift command of the particular substage, said decoding means having a plurality of outputs each of which is activated for a given shift command value for the particular substage, said plurality of outputs each being connected to either said first gating means or one of said plurality of second gating means.

3. Shifting apparatus for bidirectionally shifting a block of data one or more bit positions at a time in response to a shift command comprising a first signal indicating either an arithmetic or logic shift, a second signal indicating the direction of shift and a plurality of signals indicating the amplitude of positional shift, said shifting apparatus comprising:

register means for storing a block of data, said register means comprising a plurality of *n* bit storage locations with each bit storage location defining a particular bit position relative to the other bit storage locations;

a plurality of *n* lines each of which is connected to one of said *n* bit storage locations so as to be capable of transmitting the bit contents of the particular storage location; and shifting means, connected to said *n* lines so as to receive the incoming block of data, for bidirectionally shifting the block of data one or more bit positions at a time, said shifting means having at least one substage, said substage comprising:

a plurality of *n* bit shift cells, each bit shift cell occupying a specific bit position and comprising means, responsive to said shift command for bidirectionally shifting a bit of the incoming block of data a respective subgrouping of input lines for each bit shift cell, said respective subgrouping of input lines being a subgroup of said plurality of *n* lines, wherein the respective subgrouping of input lines within a particular substage comprises:

a first input line being operative to input a bit occupying the bit position corresponding to the bit position of the particular bit shift cell, and a plurality of input lines adjacent to said first input line, each of said plurality of adjacent input lines being operative to input a bit occupying a different bit position from the bit position occupied by the particular bit shift cell, means for generating a sign in response to said first signal indicating an arithmetic shift; and means for inputing the sign to at least one of the bit shift cells.

4. The shifting apparatus of claim 3 wherein said means for generating a sign comprises:

gating means, connected to the lowest ordered bit storage location of said register means, for outputing the binary value of the lowest ordered bit storage location in response to said first signal of said shift command indicating an arithmetic shift.

5. The shifting apparatus of claim 4 wherein said shifting means further comprises:

means for disabling the lowest ordered bit shift cell of each substage in response to said first signal indicating an arithmetic shift.

6. The shifting apparatus of claim 5 wherein said disabling means further comprises:

gating means for receiving one or more of said signals indicating the amplitude of positional shift from said control means, said gating means also receiving said first signal indicating either an arithmetic or logic shift, said gating means being operative to output a bit positional shift command of zero in response to said first signal indicating an arithmetic shift.

7. The shifting apparatus of claim 6 wherein each respective subgrouping of input lines for a bit shift cell comprises:

a first input line being operative to input a bit occupying the bit position corresponding to the bit position of the particular bit shift cell; and a plurality of input lines adjacent to said first input line, each of said plurality of adjacent input lines being operative to input a bit occupying a different bit position from the bit position occupied by the particular bit shift cell.

8. The shifting apparatus of claim 7 further comprising:

means for decoding said second signal indicating the direction of shift, and at least one of the signals indicating the amplitude of positional shift, said decoding means having a plurality of outputs each of which is connected to either said first gating means or one of said second gating means, said decoding means being operative to selectively activate either said first gating means or one of said second gating means upon activation of a particular output of said decoding means.

9. The shifting apparatus of claim 8 wherein the decoding means within the lowest ordered bit shift cells of each substage comprises:

a first input for receiving said second signal indicating the direction of shift, at least a second input for receiving at least one signal indicating the amplitude of positional shift, said second input being connected to said gating means within said disabling means so as to receive a positional shift command of zero in response to said first signal indicating an arithmetic shift.

10. The shifting apparatus of claim 9 wherein said shifting means comprises:

a plurality of substages each consisting of n bit shift cells with $n$ substage output lines, said plurality of $n$ substage output lines being either connected to the following substage or to the $n$ bit storage location of said register means.

11. In a shifting apparatus for shifting a block of data in response to a shift command, a plurality of shifting stages for successively shifting the block of data, each shifting stage having only the same number of $n$ inputs for receiving individual bits occupying given bit positions within the incoming block of data, each shifting stage furthermore receiving a particular portion of the shift command, and wherein each shifting stage comprises:

means for grouping said plurality of $n$ inputs into a plurality of $n$ subgroupings of inputs; and a plurality of only $n$ bit shift cells, each of said bit shift cells being connected to a particular subgrouping of inputs, each bit shift cell comprising:

a plurality of gating means, each of which is connected to at least one input of said particular subgrouping of inputs, and means for selectively activating only one of said plurality of gating means in response to a portion of said shift command.

12. The shifting apparatus of claim 11 wherein said means for selectively activating one of said gating means comprises:

means for decoding the particular portion of the shift command for the particular substage, said decoding means having a plurality of outputs, each of which is connected to one of said gating means.

13. Shifting apparatus for bidirectionally shifting a block of data up to $2^k$ bit positions at a time wherein $k$ is a whole number integer in response to a shift command, said shifting apparatus comprising:

register means for storing a block of data, said register means comprising a plurality of $n$ bit storage locations, each bit storage location having an input for receiving a bit of information and a bit output for transmitting a bit of information; each bit storage location defining a particular bit position within said block of data, a first shifting stage connected to said $n$ bit outputs of said register means, said first shifting stage receiving the block of data from said register means, and being operative to bidirectionally shift said block of data zero to three bit positions;

a second shifting stage, connected to said bit inputs of said register means, said second shifting stage being operative to bidirectionally shift the block of data between $2^{k-1}$ bit positions and $2^{k-2}$ bit positions, at a time, said second shifting stage outputing the shifted block of data to said register means;

and wherein each of said shifting stages comprises:

a plurality of only $n$ shifting stage inputs for receiving the block of data; and a plurality of only $n$ bit shift cells, each bit shift cell occupying a specific bit position, each bit shift cell being furthermore connected to a respective subgrouping of said $n$ shifting stage inputs, each bit shift cell comprising means, responsive to said shift command for bidirectionally shifting a bit of the incoming block of data.

14. The shifting apparatus of claim 13 wherein the shift command comprises separate shift commands for each of the shifting stages, each separate shift command comprising an amplitude of shift command of bit positional shift and a direction of shift command and wherein each respective subgrouping of said $n$ shifting stage inputs comprises:

a first shifting stage input being operative to input a bit occupying the bit position corresponding to the particular bit shift cell; and a plurality of adjacent shifting stage inputs, each of which inputs a bit occupying a different bit position which is a given number of bit positions from the bit position occupied by the particular bit shift cell, the given number of bit positions corresponding to one of the bit positional shift possible within the particular substage.

15. The apparatus of claim 14 wherein said means for bidirectionally shifting a bit of the incoming block of data in each of said bit shift cells comprises:

first gating means for gating any bit present on said first shifting stage input to the output of said bit shift cell;

a plurality of second gating means for gating respective bits present on the plurality of shifting stage inputs adjacent to said first shifting stage input to the output of said bit shift cell; and means for selectively activating one of said gating means in response to the shift command for the particular substage.

16. The shifting apparatus of claim 15 wherein said means for selectively activating one of said gating means comprises:

means for decoding the shift command for the particular shifting stage, said decoding means having a plurality of outputs each of which is activated for a given shift command value for the particular shifting stage, one of said plurality of outputs being connected to said first gating means and the remainder of said plurality of outputs each being connected to one of said plurality of second gating means.

* * * * *

UNITED STATES PATENT OFFICE

CERTIFICATE OF CORRECTION

PATENT NO. : 3,914,744

DATED : October 21, 1975

INVENTOR(S) : James L. Brown

It is certified that error appears in the above-identified patent and that said Letters Patent are hereby corrected as shown below:

IN THE CLAIMS

Claim 1, line 14, after "subgrouping" insert --of--.

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*